United States Patent
Hardee et al.

(10) Patent No.: US 11,293,773 B2
(45) Date of Patent: Apr. 5, 2022

(54) METHODS AND SYSTEMS FOR EVENT INITIATED NAVIGATIONAL ASSISTANCE

(71) Applicant: INTERNATIONAL BUSINESS MACHINES CORPORATION, Armonk, NY (US)

(72) Inventors: Christopher J. Hardee, Raleigh, NC (US); Steven R. Joroff, Tokyo (JP); Pamela A. Nesbitt, Ridgefield, CT (US); Scott E. Schneider, Rolesville, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 142 days.

(21) Appl. No.: 16/686,641

(22) Filed: Nov. 18, 2019

(65) Prior Publication Data

US 2021/0148723 A1    May 20, 2021

(51) Int. Cl.
| | | |
|---|---|---|
| *G01C 21/36* | (2006.01) | |
| *G01C 21/34* | (2006.01) | |
| *G09B 29/10* | (2006.01) | |
| *H04W 4/02* | (2018.01) | |
| *H04W 4/021* | (2018.01) | |
| *H04W 4/024* | (2018.01) | |

(52) U.S. Cl.
CPC ..... *G01C 21/3655* (2013.01); *G01C 21/3415* (2013.01); *G01C 21/362* (2013.01); *G09B 29/106* (2013.01); *H04W 4/021* (2013.01); *H04W 4/024* (2018.02)

(58) Field of Classification Search
CPC .... G09B 29/106; H04W 4/021; H04W 4/024; G01C 21/3407; G01C 21/3641
See application file for complete search history.

(56) References Cited

U.S. PATENT DOCUMENTS

| | | | |
|---|---|---|---|
| 7,395,153 B1 | 7/2008 | Nesbitt et al. | |
| 8,583,356 B2 | 11/2013 | Thomassen | |
| 9,123,243 B2 | 9/2015 | Suzuki et al. | |
| 2004/0117108 A1 | 6/2004 | Nemeth | |
| 2009/0005962 A1 | 1/2009 | Shinto | |
| 2015/0253146 A1 | 9/2015 | Annapureddy et al. | |
| 2016/0076903 A1* | 3/2016 | Diaz | G01C 21/3415 701/468 |
| 2018/0088576 A1* | 3/2018 | Kong | B60W 50/06 |
| 2020/0363814 A1* | 11/2020 | He | G05D 1/0217 |

FOREIGN PATENT DOCUMENTS

EP    1645849 A1    4/2006

* cited by examiner

*Primary Examiner* — Rodney A Butler
(74) *Attorney, Agent, or Firm* — Griffiths & Seaton PLLC

(57) ABSTRACT

Embodiments for providing navigation routes by one or more processors are described. An indication of a destination at a first location is received. A selection of a route initiating event is received. The route initiating event is detected. After the route initiating event is detected, a navigation route from a current location of a user to the destination is determined. No navigational guidance is provided to the user until the route initiating event is detected notwithstanding the user input the destination at the first location. An indication of the determined navigation route is generated thereafter.

9 Claims, 12 Drawing Sheets

METHODS AND SYSTEMS FOR EVENT INITIATED NAVIGATIONAL ASSISTANCE

CROSS REFERENCE TO RELATED APPLICATIONS

This application is a Continuation of U.S. patent application Ser. No. 15/397,089, filed on Jan. 3, 2017.

BACKGROUND OF THE INVENTION

Field of the Invention

The present invention relates in general to computing systems, and more particularly, to various embodiments for providing navigational assistance, such as navigation routes.

Description of the Related Art

Navigation systems, such as those associated with the Global Positioning System (GPS), are often used to assist users by providing a route for them to traverse in traveling from one location to another. For example, a user may use the navigation system incorporated within their cellular phone (or personal digital assistant (PDA), tablets, or vehicle) to locate the nearest grocery store and then request directions how to get to that grocery store from their current location. The directions may be provided in the form of directions (e.g., "turn left on Baker Street") or by showing them a route on a map that is displayed on their phone.

As such navigation systems become increasingly common, there is an ever-growing need to make the systems as flexible and useful as possible.

SUMMARY OF THE INVENTION

Various embodiments for providing navigation routes by one or more processors are described. In one embodiment, by way of example only, a method comprises receiving, by an electronic device, an indication of a destination input by a user at a first, originating location. The electronic device then receives a selection of a route initiating event; the route initiating event comprising a route initiating location. The route initiating event is detected by the electronic device. After the detecting of the route initiating event, a navigation route is determined from a second, current location of the user to the destination by the electronic device. The determining of any navigation route including the navigation route is performed only after the detecting of the route initiating event such that no navigation guidance is provided to the user prior to detecting the route initiating event at the second, current location notwithstanding the destination was input by the user at the first, originating location. An indication of the determined navigation route is generated and provided to the user via a display of the electronic device.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
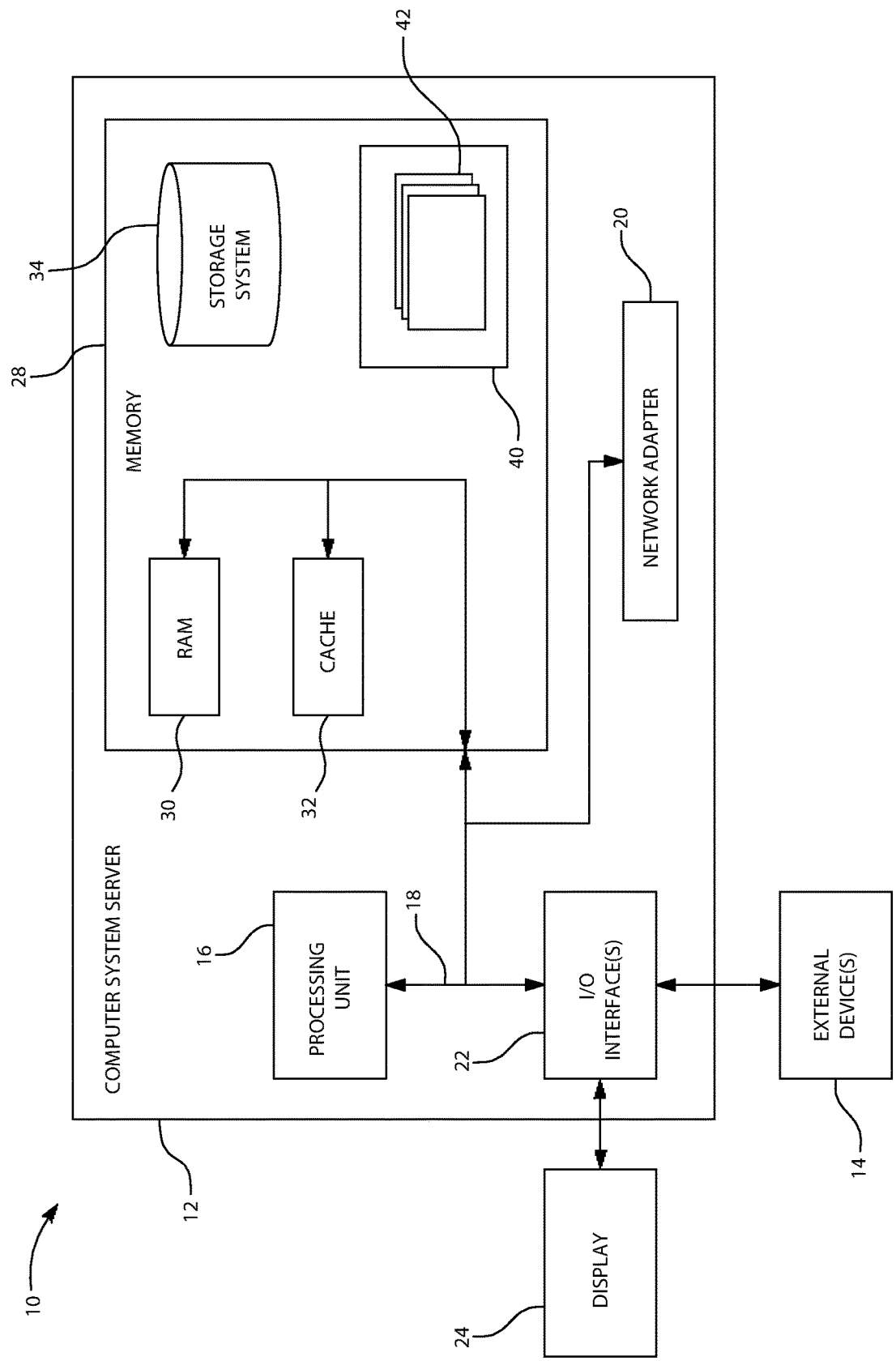
FIG. 1 is a block diagram depicting an exemplary computing node according to an embodiment of the present invention.

As previously indicated, as navigation systems become increasingly incorporated into commonly used devices, such as cellular phones, personal digital assistants (PDAs), tablets, and vehicles (e.g., automobiles, aircraft, watercraft, etc.), there is an ever-growing need to make the systems as flexible and useful as possible.

Consider an example in which a person desires to locate and drive to the grocery store that is nearest to their current location. The user may be aware of the general area in which the grocery store is located but unsure of its exact location (e.g., its location within a particular shopping center). In such an example, after the user selects the grocery store as the desired destination, most conventional navigation systems provide a navigation route from the user's current location to the grocery store, for example, without taking into account a route that the user may otherwise use to get to that general area (e.g., a scenic drive). In such a case, the system may not provide a preferred route for the user and/or may need to calculate a different route when it becomes apparent that the user is not following the route provided by the system.

In view of the foregoing, a need exists for methods and systems that provide navigation routes with improved flexibility and overall usefulness.

To address these needs, the methods and systems of the present invention, for example, provide navigation routes or navigational assistance (and/or cease providing routes/assistance) after (e.g., only after) an event is detected that initiates (or "triggers") a process by the navigation system. In some embodiments, a destination and a "route initiating event" (or "navigational assistance initiating event") are first selected. Only after the route initiating event (or an occurrence thereof) is detected is a navigation route (e.g., from the user's current location to the destination) determined and provided.

For example, the user may select the destination using an electronic device equipped with a navigation system, such as a cellular phone, PDA, tablets, or computer system in an automobile. The user may also provide an indication of a selection of the route initiating event. The selection of the route initiating event may be made in association with the specific destination (e.g., selected each time a destination is selected), or alternatively, may be stored in the system as a setting.

In some embodiments, the route initiating event is related to the position/location of the user (e.g., the position/location of the electronic device being used). As one particular example, if the user is already aware that the destination is near a particular highway, and the user plans to take that highway to drive to the destination, the user may select the route initiating event to be the user leaving that highway. In other words, the route initiating event may be the system detecting that the user has pulled off that particular highway onto a surface street. As another example, the route initiating event may be the system detecting that the user is within a certain area (e.g., within a particular distance/radius of the destination).

In some embodiments, after the route initiating event is detected, a navigation route (or navigational assistance) from the user's current location to the selected destination is determined, perhaps using the Global Positioning System (GPS). An indication of the navigation route may then be provided to the user (e.g., showing the navigation route on a map displayed on the user's electronic device, text-based directions, audio/aural directions, etc.).

In some embodiments, the route initiating event is not (only) used to begin the determining/providing of the navigation route, but to cease the determining/providing of the navigation route (or navigational assistance). For example, if a navigation route to a destination has already been provided to the user, the user may choose to cease assistance from the system at some point. For example, if the user is very familiar with a particular area, but is uncertain of how to get to that general area from his/her current location, the route initiating event may be used to stop the navigational assistance being provided (e.g., to stop audio directions).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one more processors described herein) is capable of being implemented and/or performing (or enabling or causing) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32.

Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, hand-held or laptop devices, and network PCs. However, in some embodiments, some of the components depicted in FIG. 1 may be located in a computing device in, for example, a satellite, such as a Global Position System (GPS) satellite. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
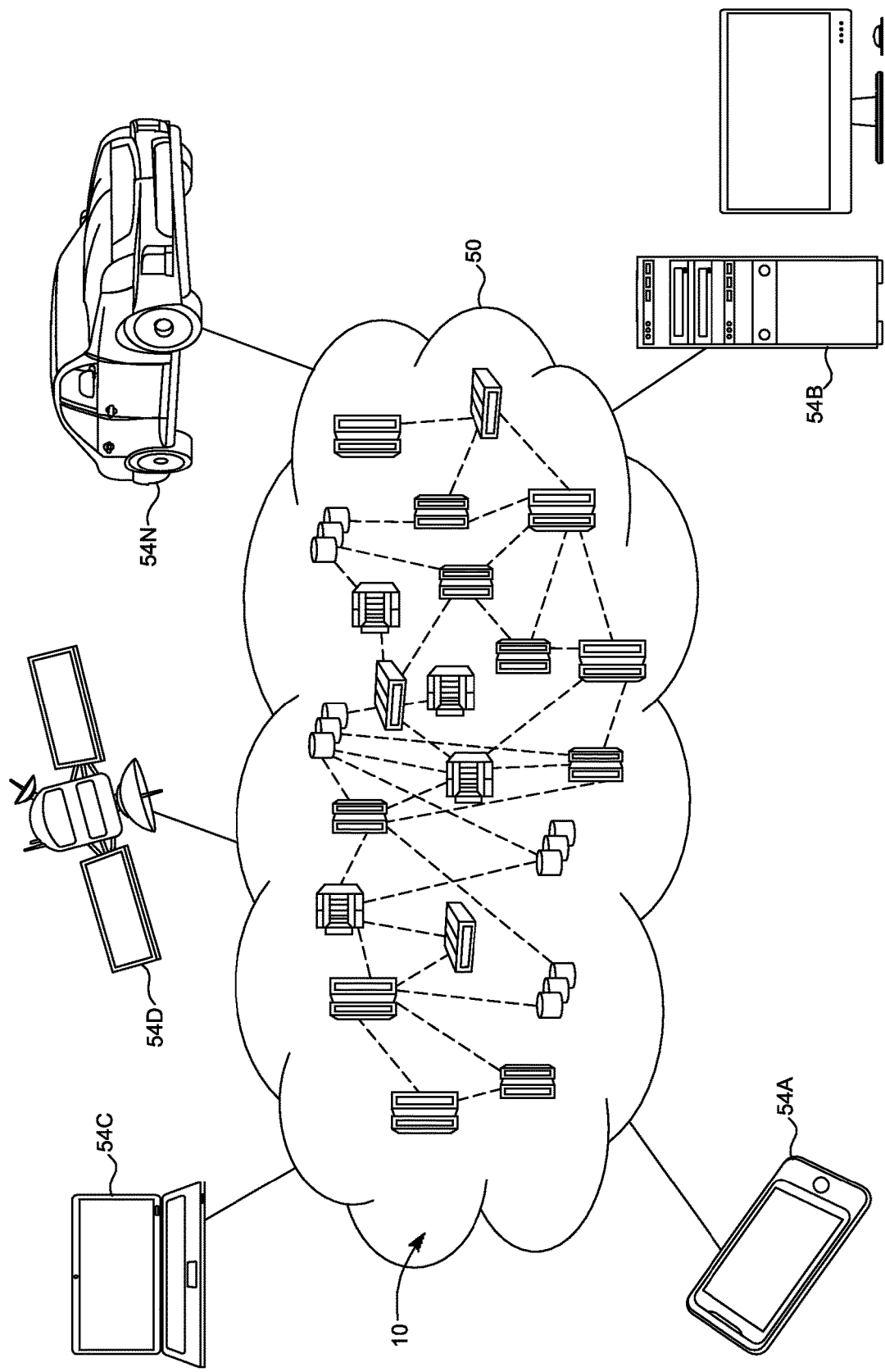
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, and/or laptop computer 54C, satellites (e.g., GPS satellites) 54D, and vehicles (e.g., automobiles, aircraft, watercraft, etc.) 54E, may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-E shown in FIG. 2 are intended to be illustrative only and that computing nodes 10 and cloud computing environment 50 can communicate with any type of computerized device over any type of network and/or network addressable connection (e.g., using a web browser).

Figure 3:
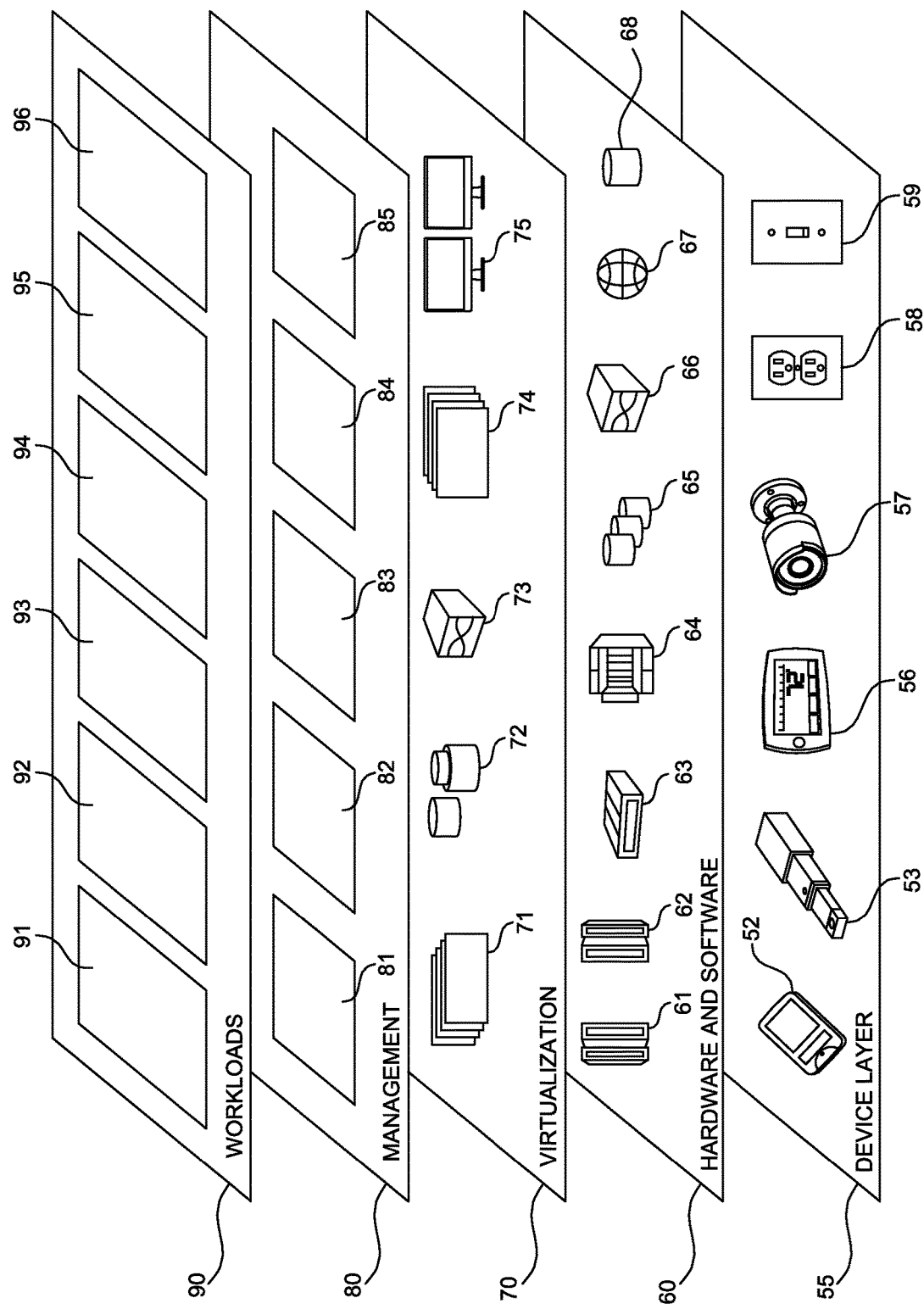
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to vehicles (e.g., automobiles, aircraft, watercraft, etc.) and satellites (e.g., GPS satellites) and any other devices and system that may be used by navigation systems, and various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for providing navigation routes and/or navigational assistance as described herein. One of ordinary skill in the art will appreciate that the image processing workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the methods and systems of the illustrated embodiments provide novel approaches for providing navigation routes (and/or navigational assistance). In some embodiments, an indication of a destination is received. A selection of a route initiating event is received. The route initiating event is detected. After the route initiating event is detected, a navigation route from a current location of a user to the destination is determined. An indication of the determined navigation route is generated.

In some embodiments, the route initiating event is detected after the receiving of the indication of the destination and the receiving of the selection of the route initiating event. The navigation route (or navigational assistance) may be determined (or calculated) only after the route initiating event is detected. In some embodiments, the route initiating event is related to the current location of the user (and/or an electronic device associated with the user), such as the user arriving at a particular location. The destination may be selected before the user arrives at the location from which the navigation route begins.

In some embodiments, the generating of the indication of the navigation route (or navigational assistance) is performed using a display screen on a computing device associated with the user. The navigation route (or navigational assistance) and the detecting of the location of the user are performed using the Global Positioning System (GPS).

Figure 4:
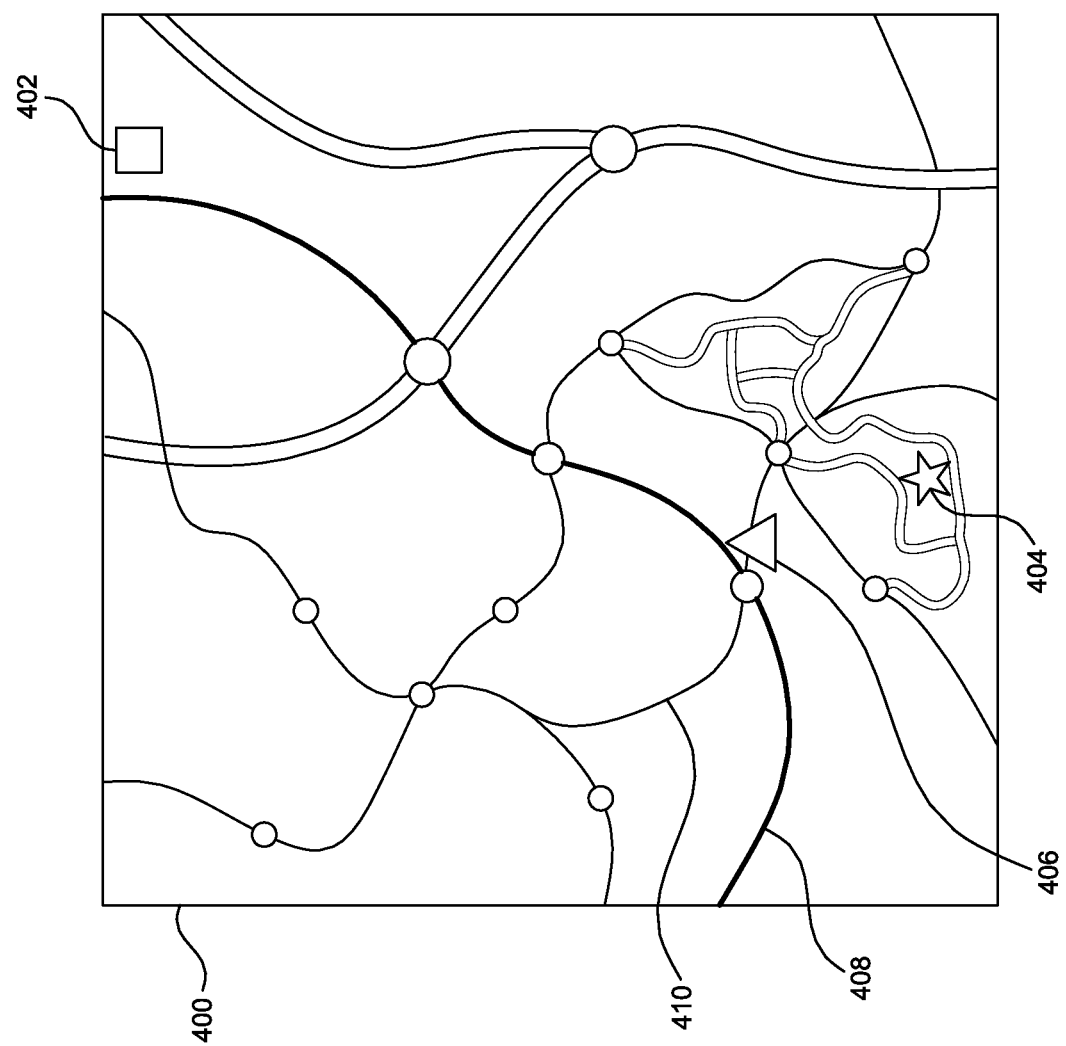
FIG. 4 is a plan view of a map of a region, showing the location of a user, a destination, and a location associated with a route initiating event, in accordance with various aspects of the present invention.

Referring to FIG. 4, a map 400 of a particular geographic region, having various roadways and other features, is shown. It should be understood that the map 400 may be displayed on an electronic device, such as a cellular phone, PDA, tablet, or computer system in a vehicle, such as an automobile. However, the map 400 may also be used simply to illustrate aspects of functionality in accordance with some embodiments described herein.

On the map 400, a (current) location of a user (and/or an electronic device in use by/associated with the user) 402 is indicated. In some embodiments, a destination 404 is selected (e.g., by the user 402). The selection of the destination 404 may be made in any suitable manner, such as pressing the appropriate location on the map 400 (e.g., via a touchscreen), text commands, voice commands, etc.

In some embodiments, the user 402 also selects a route initiating event. The route initiating event may be entered in a manner similar to that of the selection of the destination. However, in some embodiments, the route initiating event may be stored as a setting. In the example shown in FIG. 4, the route initiating event has been selected as the user arriving at a particular location, which may be referred to as a "route initiating location" 406. As is evident in FIG. 4, the route initiating location 406 corresponds to a location near an intersection of a major roadway (or highway) 408 with a surface street 410. As will be described below, the route initiating location 406 may be a location that the user 402 expects to traverse on his/her way from his/her location shown in FIG. 4 to the destination 404.

It should be noted that in at least some embodiments, no navigational route (or assistance) is determined or provided to the user 402 when the user 402 is at his/her location indicated in FIG. 4 (i.e., his/her location when the destination is selected). In other words, although a destination has been provided to the navigation system, no route or directions have yet been determined or provided to the user (i.e., because the route initiating event has not yet occurred/been detected).

Figure 5:
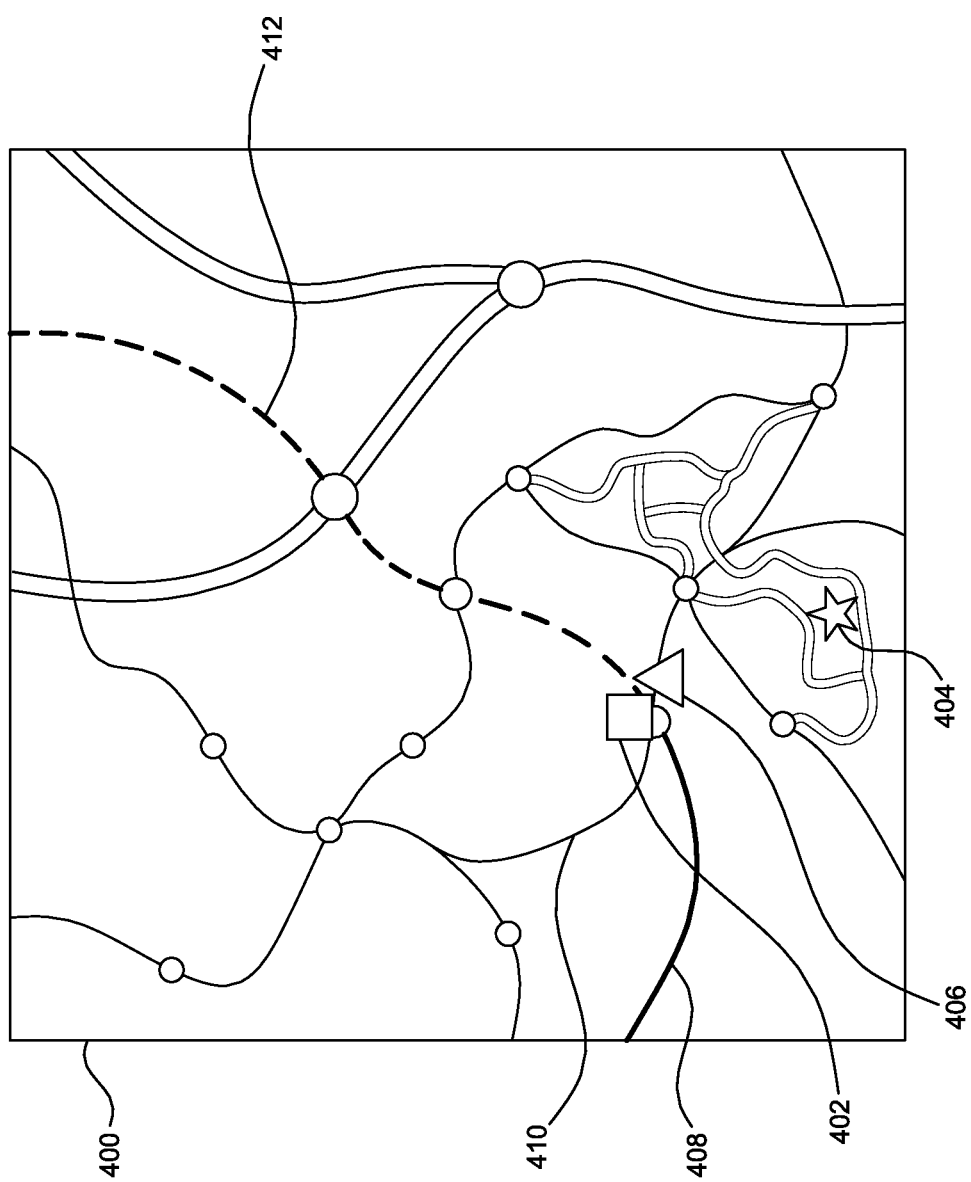
FIGS. 5 and 6 are plan views of the map of FIG. 4, illustrating additional aspects of the present invention.
Figure 6:
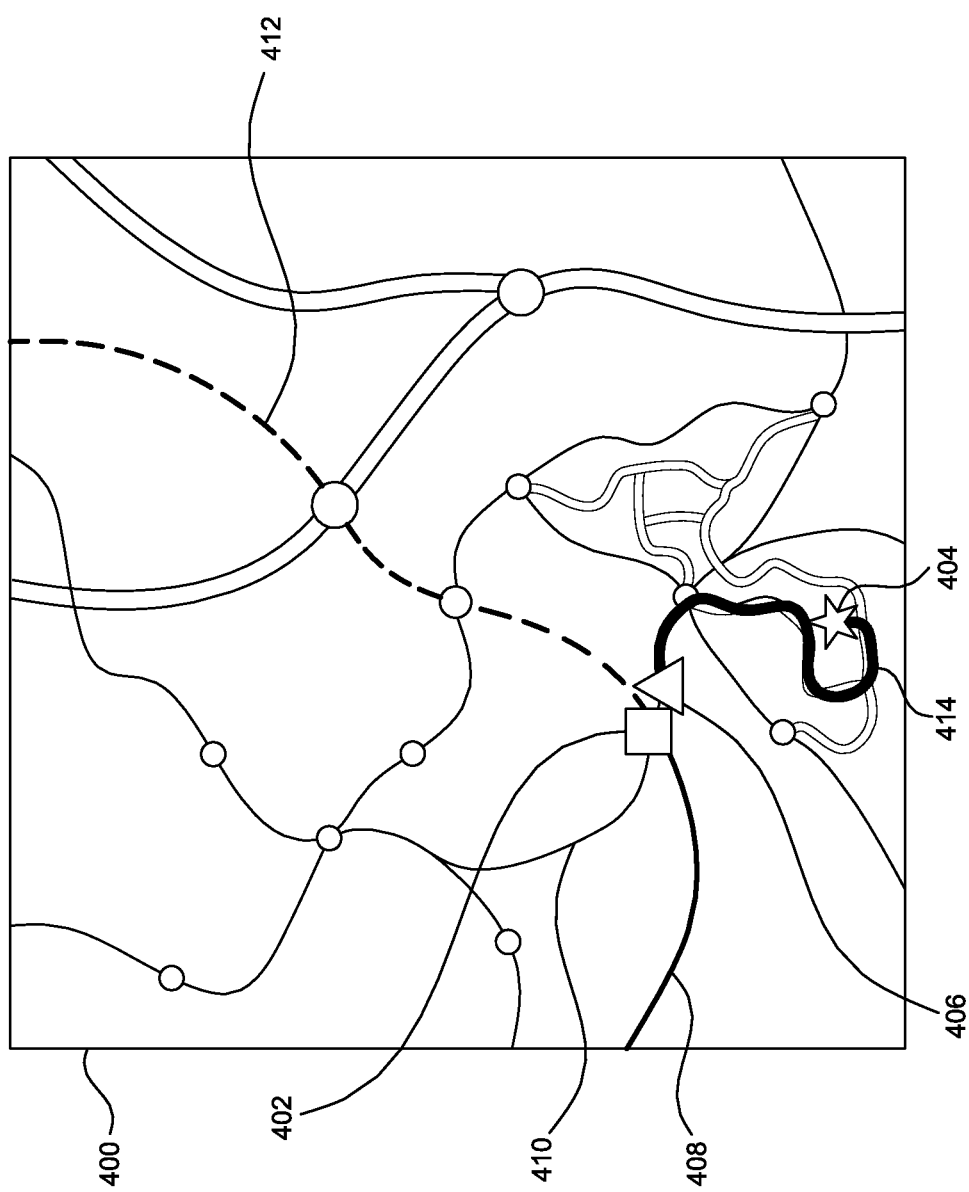

The user 402 then travels (e.g., via an automobile) from his/her location indicated in FIG. 4 to that shown in FIG. 5 along, for example, highway 408, as indicated by the dashed line 412 shown. Referring now to FIG. 6, when the user 402 arrives at the route initiating location 406 (i.e., when the route initiating event occurs and/or is detected), a navigation route 414 (e.g., from the current location of the user to the destination 404) is then determined, and in at least some embodiments, an indication of the navigation route 414 is generated and provided to the user.

Figure 7:
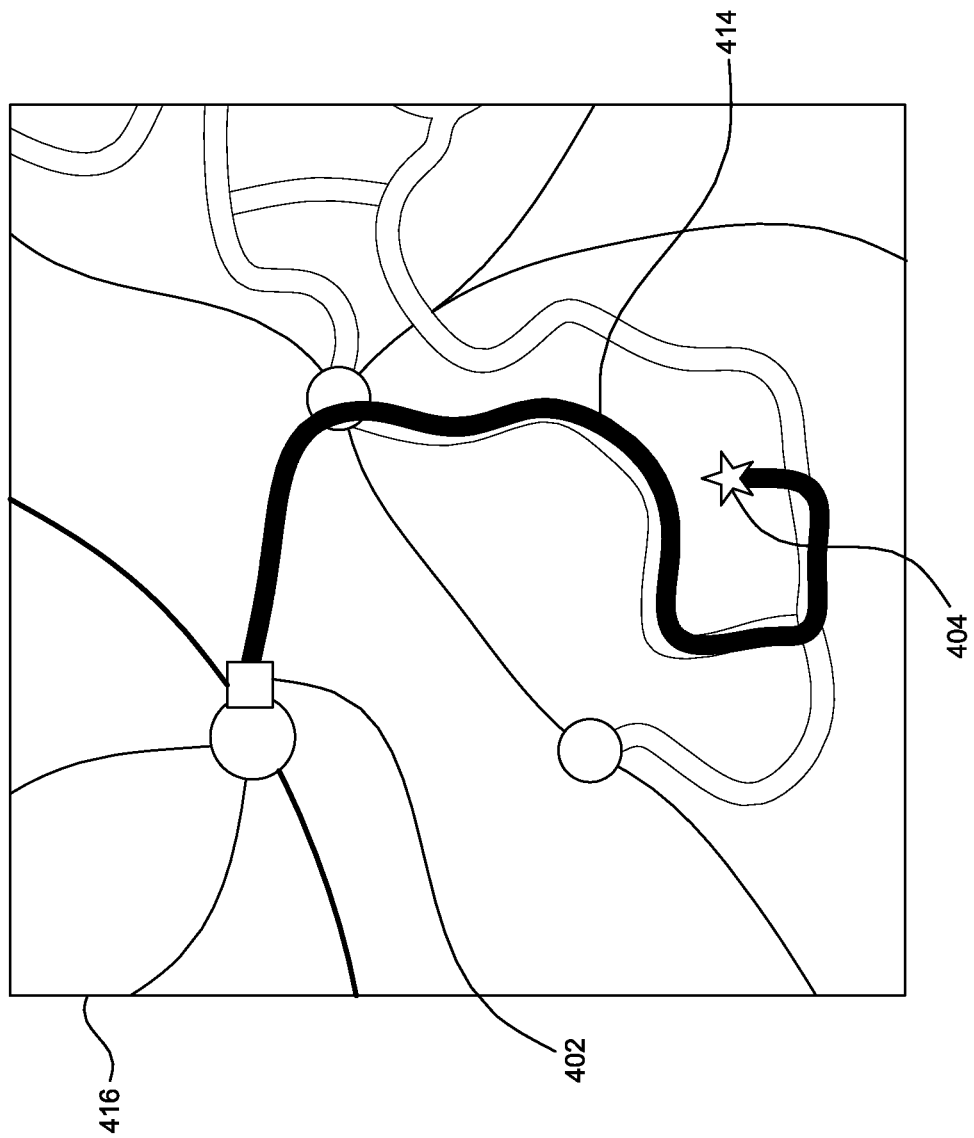
FIG. 7 is a plan view of a portion of the map of FIG. 4, illustrating additional aspects of the present invention.

In some embodiments, the navigation route 414 is indicated on a map (e.g., map 400), as shown in FIG. 6, as well as FIG. 7, which shows a "zoomed in" map 416 of the appropriate portion of the region shown in FIGS. 4-6. As shown most clearly in FIG. 7, the navigation route 414 appropriately follows the roadways in the region in such a way that the user 402 may travel (e.g., via an automobile) along the roadways from their current location to the destination 404. The user may then use the navigation route 414 to travel to the destination 404, at which point, the navigation routing process (and/or the navigational assistance) may be ceased.

It should be understood that the navigation route 414 may be indicated to the user in other ways. For example, rather than (or perhaps in addition to) showing the navigation route 414 on a map, navigational assistance and/or directions (e.g., "turn right on Baker St.," "go straight for 1 mile," etc.) may be provided via textual and/or audio (or aural) messages.

In some embodiments, the route initiating event may (also) be used to cease the providing of a previously initiated navigation route (or navigational assistance). For example, referring to FIG. 5, dashed line 412 may indicate a navigation route (or directions) that began at the location of the user when the destination 404 was selected (i.e., the location of the user 402 shown in FIG. 4). In some embodiments, when the user arrives at the route initiating location 406, the navigational assistance is ceased. Such an embodiment may be particularly useful when the user is familiar with the particular area in which the destination 404 is located, but is unsure how to get to that area and/or when the navigation route (or navigational assistance) is being provided via audio (or aural) messages (e.g., when the user is in an area he/she is familiar with, the audio messages stop).

Figure 8:
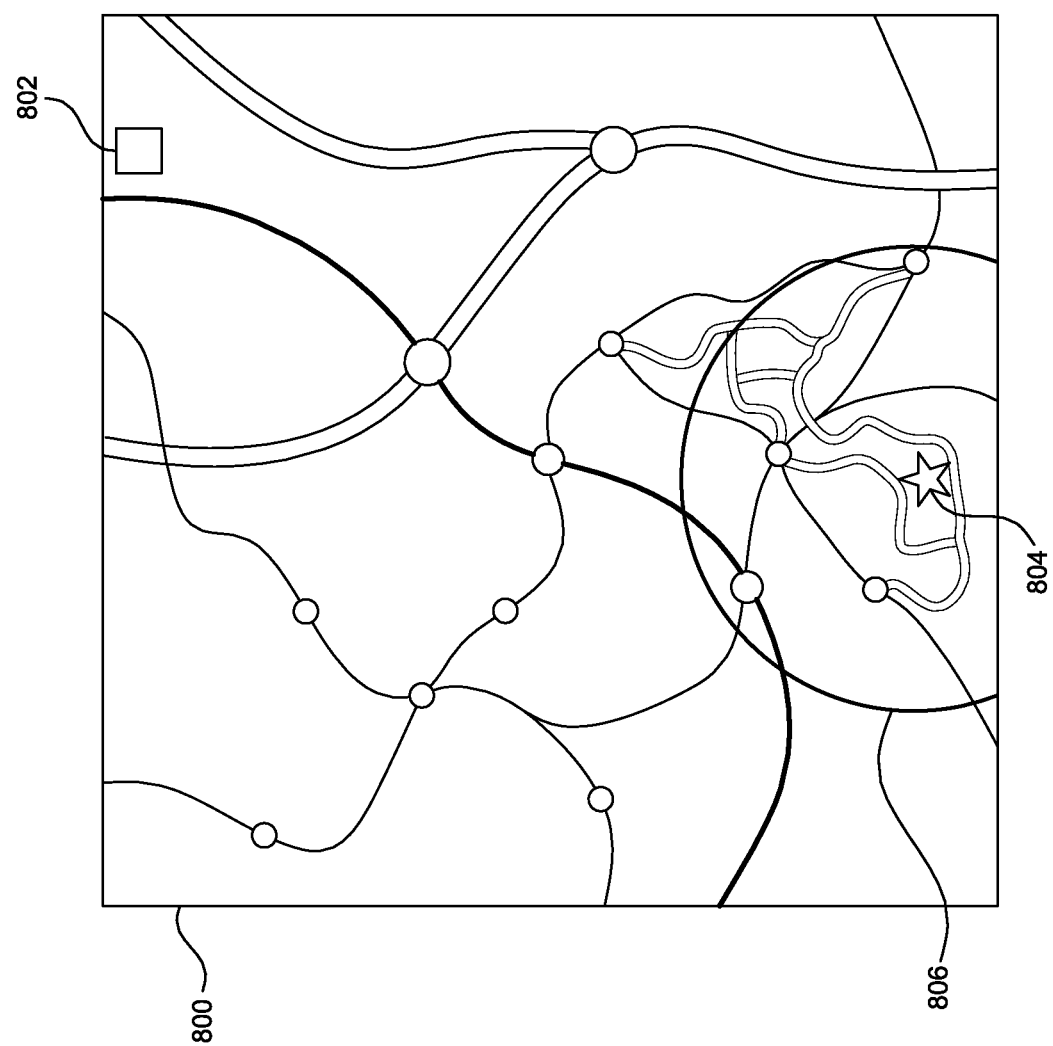
FIG. 8 is a plan view of a map of a region, showing the location of a user, a destination, and a route initiating range, in accordance with various aspects of the present invention.

Referring to FIG. 8, another map 800 of the region is shown. As with FIGS. 4-7, a location of a user 802 and a selected destination 804 are shown. In the particular embodiment depicted in FIG. 8, the route initiating event is selected to be the user traveling within a range or radius extending around the destination 804, or a route initiating range (or radius) 806.

It should again be noted that in at least some embodiments, no navigation route (or assistance) is determined or provided to the user 802 when the user 802 is at his/her location indicated in FIG. 8. In other words, although a destination has been provided to the navigation system, no route or directions have yet been determined or provided to the user (i.e., because the route initiating event has not yet occurred/been detected).

Figure 9:
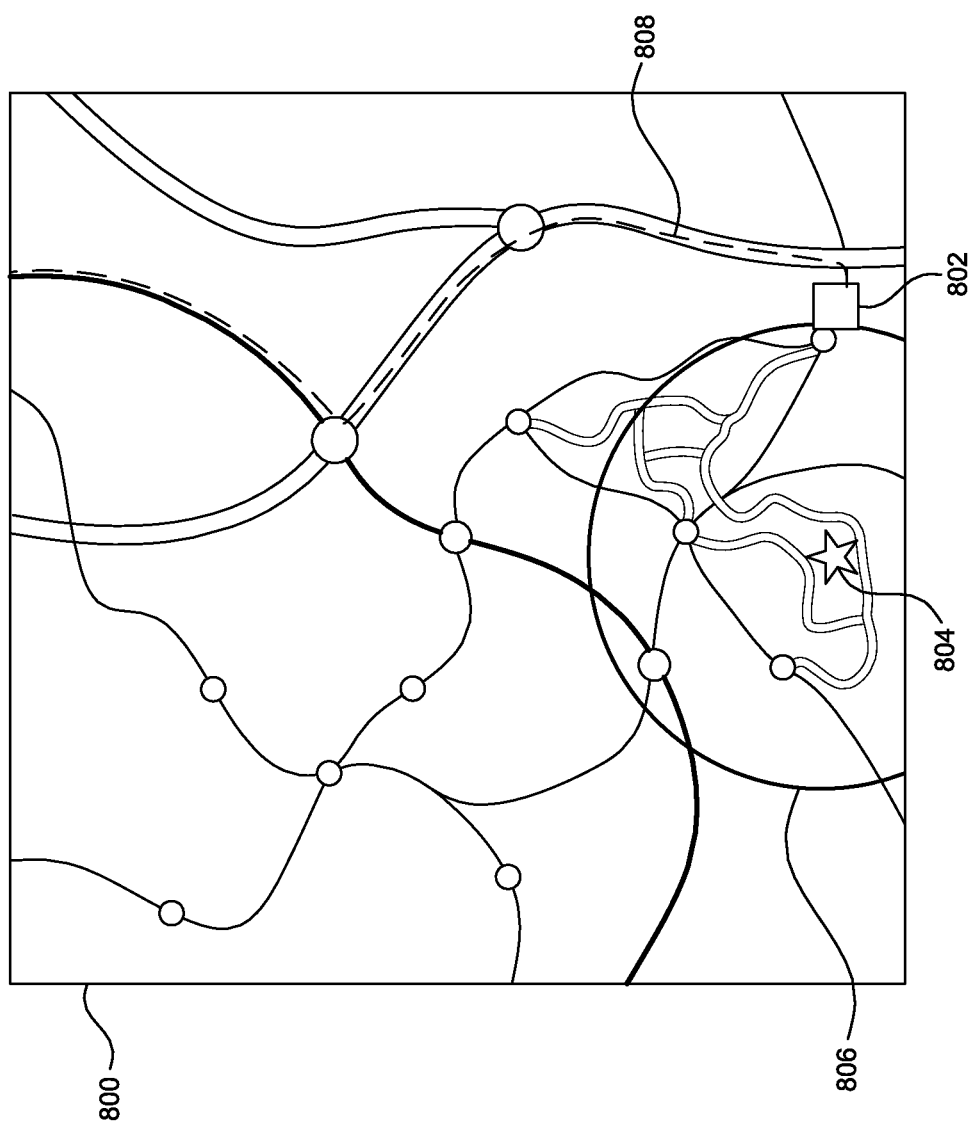
FIGS. 9 and 10 are plan views of the map of FIG. 8, illustrating additional aspects of the present invention.
Figure 10:
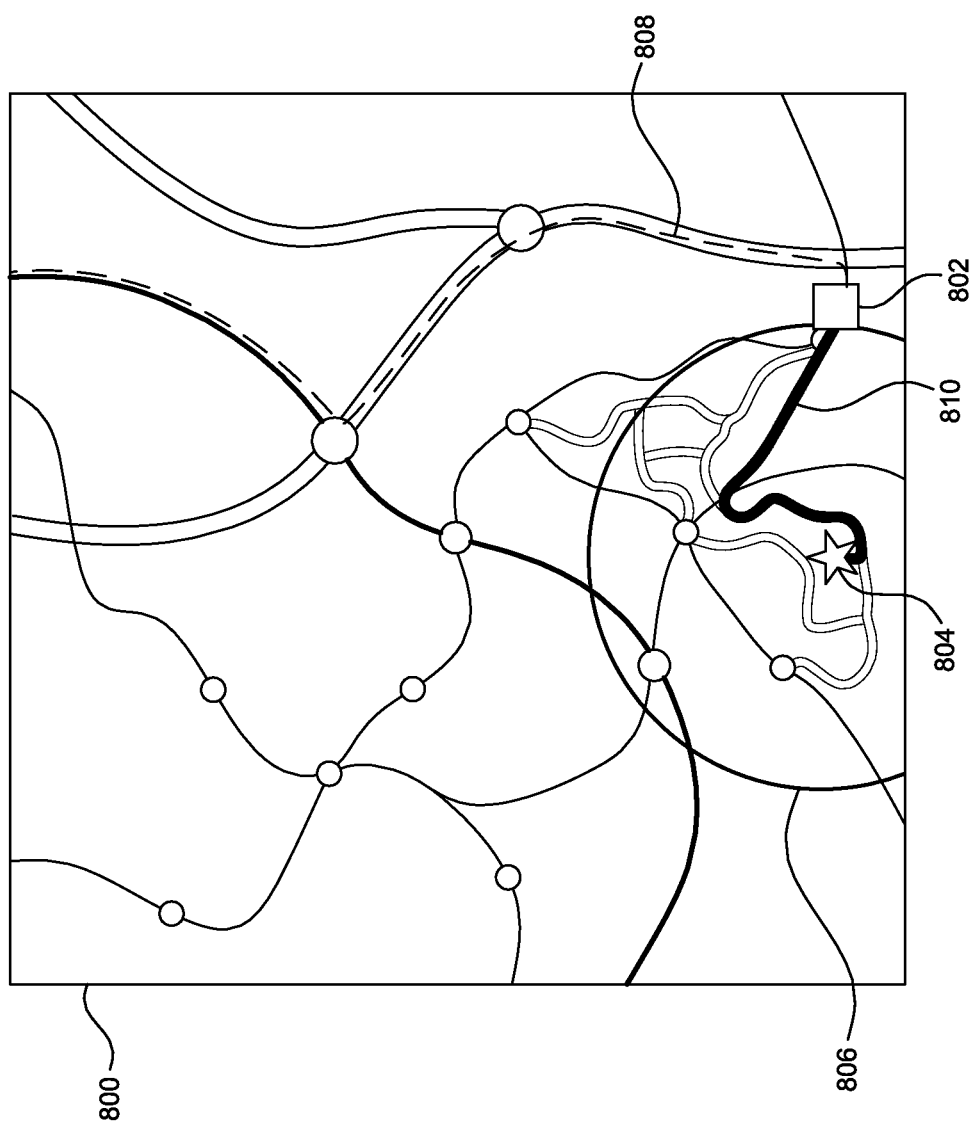

As shown in FIG. 9, the user 802 then travels (e.g., via an automobile) in the general direction of the destination 804 using the roadways shown on the map 800, as indicated by dashed line 808. As shown in FIG. 10, when the user 802 travels to within the route initiating range 806 (i.e., when the route initiating event occurs and/or is detected), a navigation route 810 (e.g., from the current location of the user to the destination 804) is then determined, and in at least some embodiments, an indication of the navigation route 810 is generated and provided to the user, in a manner similar to that described above.

Figure 11:
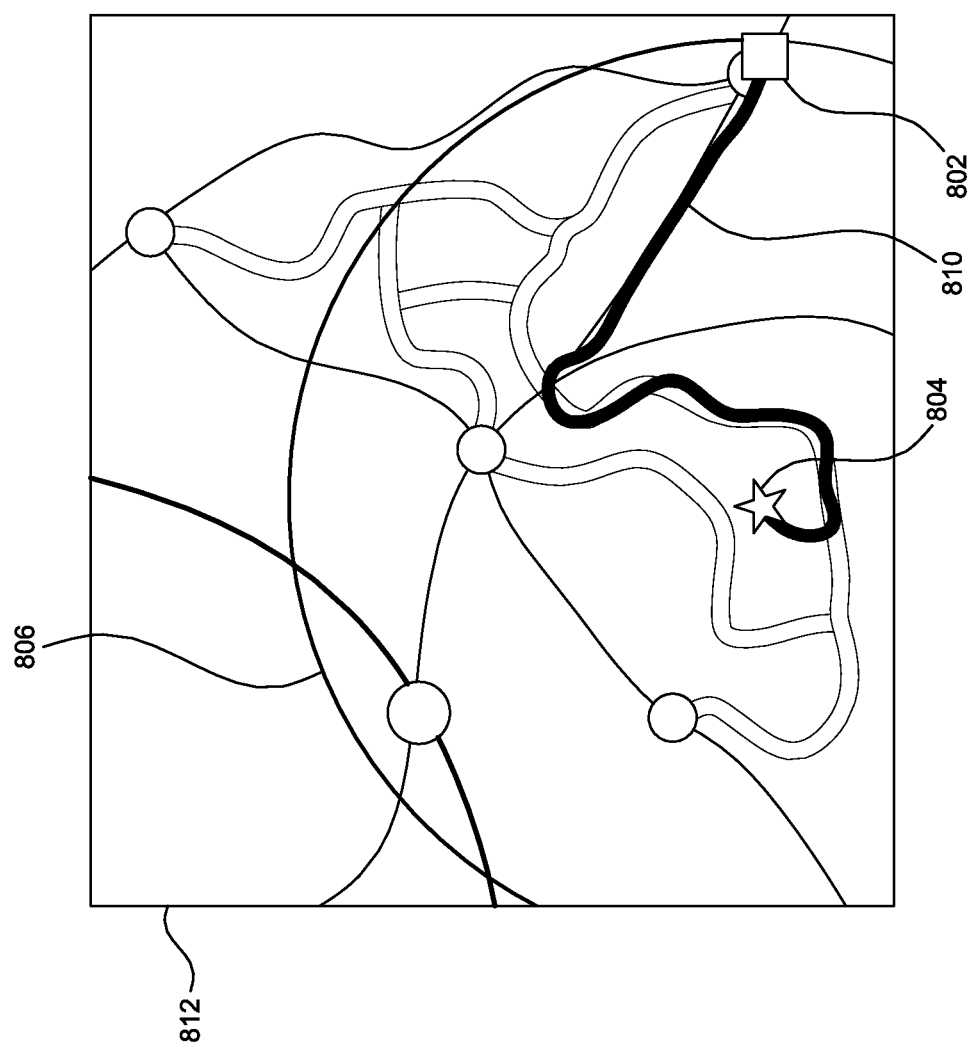
FIG. 11 is a plan view of a portion of the map of FIG. 8, illustrating additional aspects of the present invention.

FIG. 11 shows a "zoomed in" map 812 of the appropriate portion of the region shown in FIGS. 8-10, on which the navigation route 810 is shown (e.g., as may be displayed on an electronic device). As shown, the navigation route 810 appropriately follows the roadways in the region in such a way that the user 802 may travel (e.g., via an automobile) along the roadways from their current location to the destination 804.

In some embodiments, such as those in which the routing initiating event is a setting stored in the system, the navigation route, or assistance, may be initiated when the user is detected as traveling into an area that is determined to be outside of areas that the user is unfamiliar with (e.g., based on history). That is, even if no route initiating event is specified, the system may recognize that the selected destination is in an area to which the user has not previously traveled. In such an event, navigational assistance, such as that described above, may be automatically provided.

Further, in some embodiments, even if no route initiating event is specified, the system may recognize that the user is traveling along a route (and/or in a direction) that is not reasonable given the selected destination (e.g., the user is traveling in the wrong direction and/or has passed the selected destination). In such an event, navigational assistance may be automatically provided.

Figure 12:
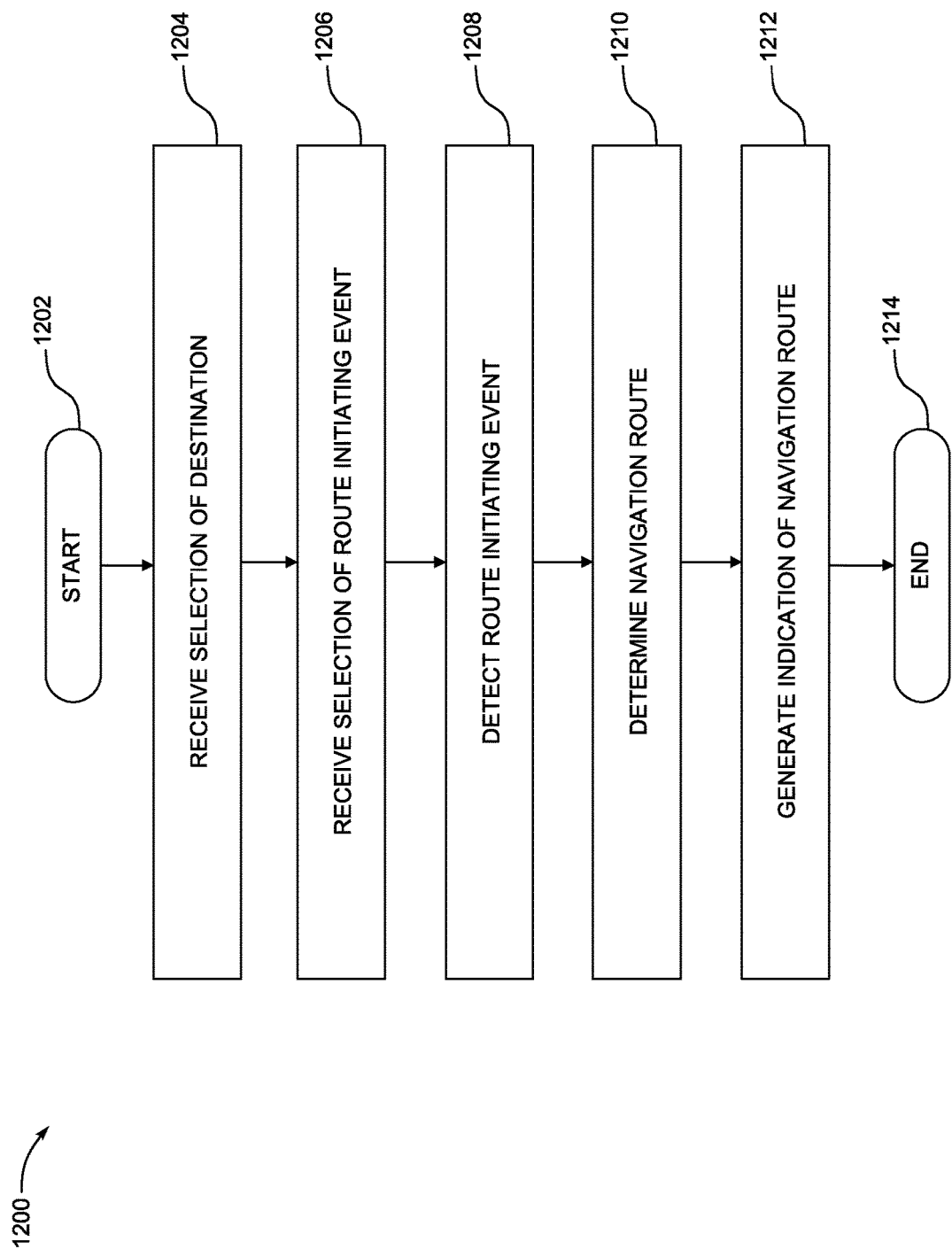
FIG. 12 is a flowchart diagram depicting an exemplary method for providing navigation routes in which various aspects of the present invention may be implemented.

Turning to FIG. 12, a flowchart diagram of an exemplary method 1200 for providing a navigation route, in which aspects of the present invention may be implemented, is illustrated. Method 1200 begins (step 1202) with, for example, a user deciding that he/she desires to travel to a destination and/or initiating a navigational system on an electronic device, such as a cellular phone, PDA, tablet, or computer system in an automobile.

A destination is then selected by a user, or a selected destination (or an indication thereof) is received (step 1204). The selection of the destination may be made in any suitable manner, such as pressing the appropriate location on the map (e.g., via a touchscreen), text commands, voice commands, etc.

A route initiating event is then selected by the user, or a selected route initiating event (or an indication thereof) is received (step 1206). As described above, the route initiating event may be associated with the location of the user (and/or an electronic device used by and/or associated with the user). For example, the route initiating event may be the user arriving at a particular location or the user traveling within a particular range or distance of the destination. In some embodiments, the route initiating event is specified in such a manner that is associated with a particular destination (e.g., the selected location). However, in some embodiments, the route initiating event may be stored as a setting.

After the route initiating event is detected (step 1208), a navigation route (or navigational assistance) is determined (step 1210). In some embodiments, the determined navigation route begins at the current location of the user (and/or an electronic device associated with the user) and ends at the selected destination. As described above, in some embodiments, the route initiating event is used to cease navigational assistance, such as a route, that was previously initiated.

An indication of the determined navigation route is then generated (step 1212) and provided to the user. As described above, the indication may be provided in any suitable manner, such as showing the navigation route on a map displayed on the user's electronic device, text-based directions, audio/aural directions, etc.

Method 1200 ends (step 1214) with, for example, the user (and/or the electronic device associated with the user) arriving at the selected destination, at which point the navigational assistance may be ceased. Method 1200 may then be re-initiated by the selection of another destination and/or route initiating event.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by one or more processors, for providing a navigation route, comprising:
   receiving, by an electronic device, an indication of a destination input by a user at a first, originating location;
   receiving, by the electronic device, a selection of a route initiating event; wherein the route initiating event comprises a route initiating location;
   detecting the route initiating event by a Global Positioning System (GPS) integrated into the electronic device;
   after the detecting of the route initiating event, determining the navigation route commencing from a second, current location of the user to the destination by the GPS integrated into the electronic device; wherein the determining of any navigation route including the navigation route is performed only after the detecting of the route initiating event such that no navigation guidance is provided to the user prior to detecting the route initiating event at the second, current location notwithstanding the destination was input by the user at the first, originating location; and
   generating an indication of the determined navigation route provided to the user via a display of the electronic device.

2. The method of claim 1, wherein the detecting of the route initiating event occurs after the receiving of the indication of the destination and the receiving of the selection of the route initiating event.

3. The method of claim 1, wherein the route initiating event is detecting the user arriving at the current location of the user.

4. A system for providing a navigation route, comprising:
   an electronic device having at least one processor that
      receives, by an electronic device, an indication of a destination input by a user at a first, originating location;
      receives, by the electronic device, a selection of a route initiating event; wherein the route initiating event comprises a route initiating location;
      detects the route initiating event by a Global Positioning System (GPS) integrated into the electronic device;
      after the detecting of the route initiating event, determines the navigation route commencing from a second, current location of the user to the destination by the GPS integrated into the electronic device; wherein the determining of any navigation route including the navigation route is performed only after the detecting of the route initiating event such that no navigation guidance is provided to the user prior to detecting the route initiating event at the second, current location notwithstanding the destination was input by the user at the first, originating location; and
      generates an indication of the determined navigation route provided to the user via a display of the electronic device.

5. The system of claim 4, wherein the detecting of the route initiating event occurs after the receiving of the indication of the destination and the receiving of the selection of the route initiating event.

6. The system of claim 4, wherein the route initiating event is detecting the user arriving at the current location of the user.

7. A computer program product for providing a navigation route by one or more processors, the computer program product comprising a non-transitory computer-readable storage medium having computer-readable program code portions stored therein, the computer-readable program code portions comprising:
   an executable portion that receives, by an electronic device, an indication of a destination input by a user at a first, originating location;
   an executable portion that receives, by the electronic device, a selection of a route initiating event; wherein the route initiating event comprises a route initiating location;
   an executable portion that detects the route initiating event by a Global Positioning System (GPS) integrated into the electronic device;
   an executable portion that, after the detecting of the route initiating event, determines the navigation route commencing from a second, current location of the user to the destination by the GPS integrated into the electronic device; wherein the determining of any navigation route including the navigation route is performed only after the detecting of the route initiating event such that no navigation guidance is provided to the user prior to detecting the route initiating event at the second, current location notwithstanding the destination was input by the user at the first, originating location; and an executable portion that generates an indication of the determined navigation route provided to the user via a display of the electronic device.

8. The computer program product of claim 7, wherein the detecting of the route initiating event occurs after the receiving of the indication of the destination and the receiving of the selection of the route initiating event.

9. The computer program product of claim 7, wherein the route initiating event is detecting the user arriving at the current location of the user.

* * * * *